CARTON FOLDING AND CLOSING MACHINE
Filed Jan. 22, 1965 10 Sheets-Sheet 1
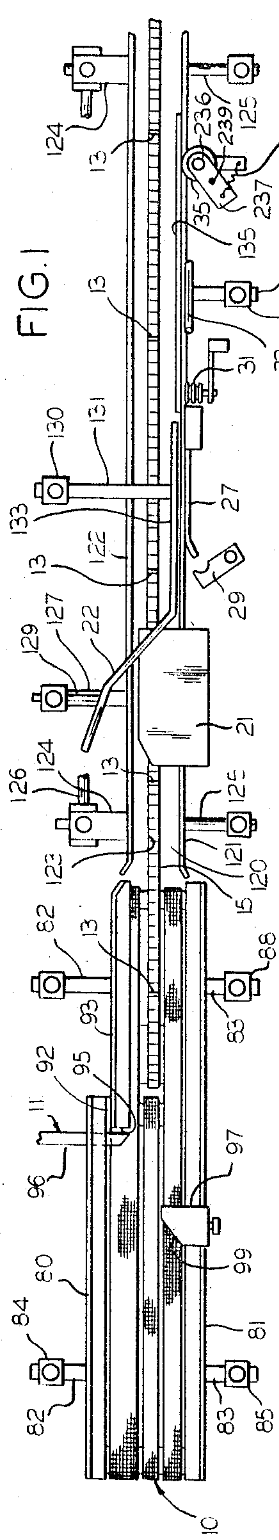
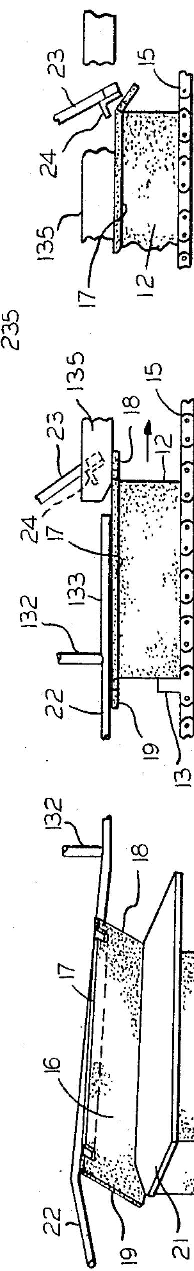
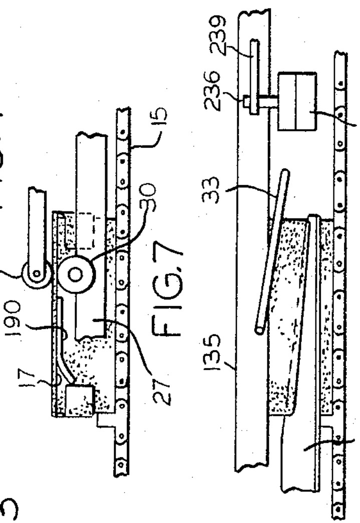
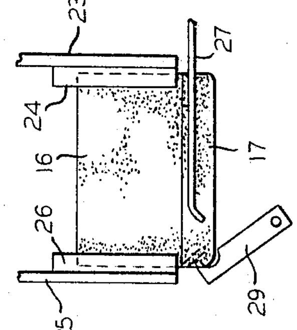
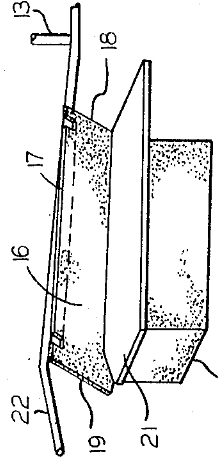
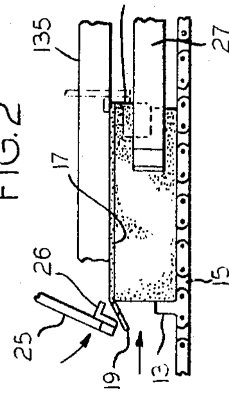
INVENTOR
RICHARD C. TALBOT
BY
Hill, Sherman, Meroni, Gross & Simpson
ATTORNEYS INVENTOR
RICHARD C. TALBOT
BY Hill, Sherman, Meroni, Gross & Simpson
ATTORNEYS

INVENTOR
RICHARD C. TALBOT
BY
ATTORNEYS

INVENTOR
RICHARD C. TALBOT

BY

Hill, Sherman, Meroni, Gross & Simpson

ATTORNEYS

CARTON FOLDING AND CLOSING MACHINE

Filed Jan. 22, 1965 10 Sheets-Sheet 5

INVENTOR
RICHARD C. TALBOT
BY Hill, Sherman, Meroni, Gross & Simpson
ATTORNEYS

CARTON FOLDING AND CLOSING MACHINE

INVENTOR
RICHARD C. TALBOT

BY

Hill, Sherman, Meroni, Gross & Simpson
ATTORNEYS

CARTON FOLDING AND CLOSING MACHINE

Filed Jan. 22, 1965

INVENTOR
RICHARD C. TALBOT
BY
Hill, Sherman, Meroni, Gross & Simpson
ATTORNEYS

CARTON FOLDING AND CLOSING MACHINE
Filed Jan. 22, 1965 10 Sheets-Sheet 8
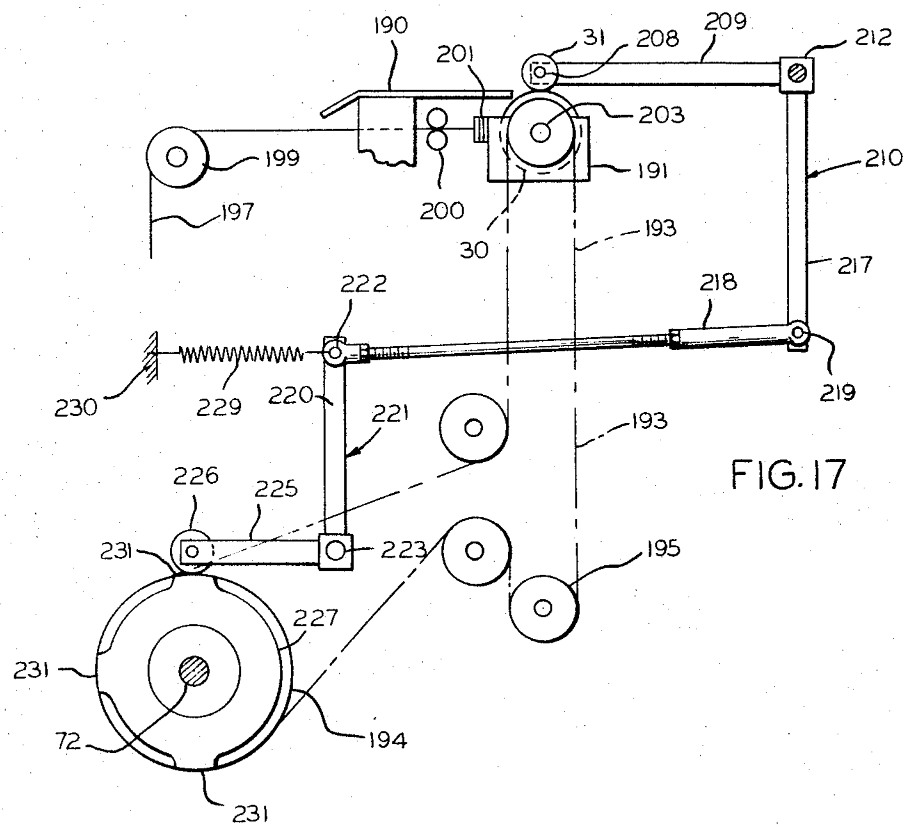
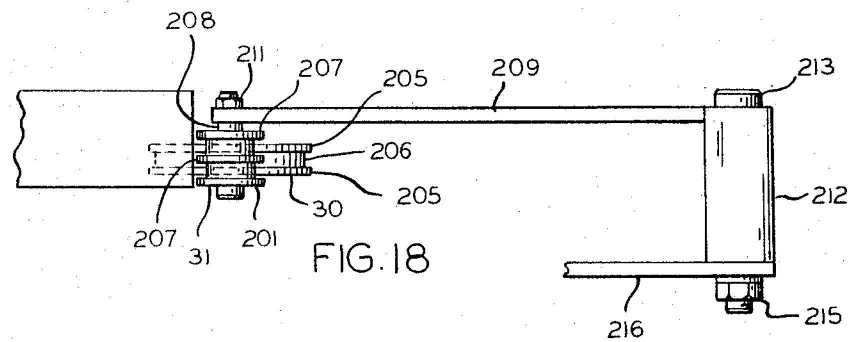
INVENTOR
RICHARD C. TALBOT
BY
Hill, Sherman, Meroni, Gross & Simpson
ATTORNEYS

CARTON FOLDING AND CLOSING MACHINE

Filed Jan. 22, 1965

INVENTOR
RICHARD C. TALBOT
BY
Hill, Sherman, Meroni, Gross & Simpson
ATTORNEYS

INVENTOR
RICHARD C. TALBOT

BY

Hill, Sherman, Meroni, Gross & Simpson

ATTORNEYS

United States Patent Office 3,332,212
Patented July 25, 1967

1

3,332,212
CARTON FOLDING AND CLOSING MACHINE
Richard C. Talbot, Skokie, Ill., assignor to Peters Machinery Company, Chicago, Ill., a corporation of Illinois
Filed Jan. 22, 1965, Ser. No. 427,288
20 Claims. (Cl. 53—376)

This invention relates to improvements in apparatus for folding, closing and glueing the covers of cartons.

A principal object of the invention is to provide a simple and improved apparatus for folding and closing covers of loaded traveling cartons and glueing the covers during the closing operation.

A further object of the invention is to provide a novel form of carton folding and closing apparatus arranged with a view toward utmost simplicity in construction and efficiency in folding and closing the carton.

Another object of the invention is to simplify the closing of loaded thin walled cartons by glueing the projecting front flap of the cover during the folding and closing operation with a quick setting glue, all while the carton is in motion and by securing the cover in a closed condition by folding the glued flap over into engagement with the side of the carton.

Still another object of the invention is to provide a simple and improved form of carton folding and closing machine in which the carton is carried past its folding and closing stations by the spaced flights of a flight conveyor and in which a simple and improved timing means, times the carton to be picked up by the flights of the conveyor.

Still another object of the invention is to improve upon the carton folding and closing apparatus heretofore in use, by successively carrying the cartons past their folding and closing stations by the flights of a continuously traveling flight conveyor and by providing side-by-side belt conveyors conveying the cartons to the flight conveyor, in which the cartons are positively deflected to stop means extending over one of the belt conveyors, as they pass to the flight conveyor, and are pushed from the stop means in timed relation with respect to travel of the flight conveyor to continue their travel on the belt conveyors to be picked up by the flights of the flight conveyor.

Another and important object of the invention is to provide a simple and improved traveling folding means folding down the end flaps of successive cartons and the traveling with and releasing the carton for further folding operations thereof, at the termination of the end flap folding operations.

A still further object of the invention is to provide an improved form of carton folding and closing machine folding and closing a carton having a hinged lid, an end flap extending forwardly therefrom and oppositely extending side flaps, all while the cartons are successively supplied to the folding and closing apparatus, in which the end flap is glued at spaced apart points with a quick setting glue and folded into engagement with the front wall of the carton, and the lid is maintained closed by pressure and setting of the glue, all while the carton is continuously traveling.

Another object of the invention is to provide a more efficient form of continuously traveling carton closing apparatus, particularly adapted to close cartons filled with bakery goods and maintain the carton in its closed position, in a cleaner manner than formerly, and with no attention from the operator of the machine.

These and other objects of the invention will appear from time to time as the following specification proceeds and with reference to the accompany drawings wherein:

FIGURE 1 is a diagrammatic plan view of a carton folding and closing apparatus constructed in accordance with the principles of the present invention, with certain parts removed;

2

FIGURE 2 is a diagrammatic view illustrating the folding of the cover over the carton;

FIGURE 3 is a diagrammatic view illustrating the initiation of the folding of a leading side flap along the advance wall of the carton;

FIGURE 4 is a diagrammatic view illustrating a further step in folding the leading side flap along an advance wall of the carton;

FIGURE 5 is a view illustrating the folding of the trailing side flap along the trailing wall of the carton;

FIGURE 6 is a diagrammatic plan view illustrating the folding of the projecting tabs of the advance and trailing flaps along the front wall of the carton;

FIGURE 7 is a diagrammatic side elevational view showing the steps of applying glue to the underside of the projecting end flap of the cover;

FIGURE 8 is a diagrammatic side elevational view showing the folding of the front side flap along the front wall of the carton and showing the pressure roller for maintaining pressure on the flap until setting of the glue;

FIGURE 17 is a diagrammatic side elevational view illustrating the drive to the grooved roller and the cam means for periodically engaging the pressure roller with the top of the carton flap to effect the application of glue to the underside thereof;

FIGURE 18 is a diagrammatic plan view showing the pressure roller and glue roller in plan;

Figure 9:
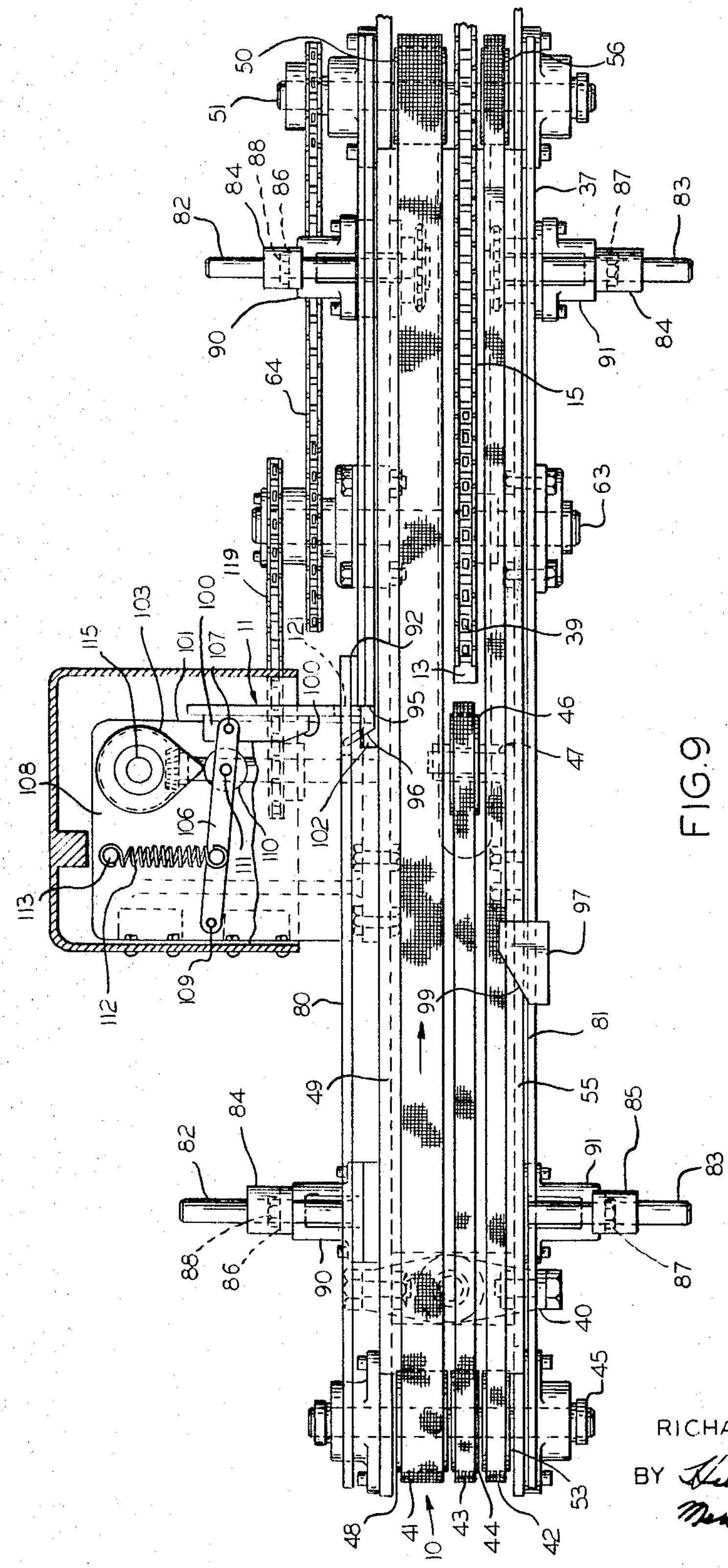
FIGURE 9 is a fragmentary plan view of the carton supply end of the apparatus, illustrating the supply and timing means supplying cartons for folding and closing in timed relation with respect to travel of the flights of the folding and closing conveyor, with certain parts broken away and certain other parts shown in horizontal section.

In the embodiment of the invention diagrammatically illustrated in FIGURES 1 through 9 of the drawings, I have shown in FIGURE 1 a carton supply conveyor means 10 and timer means 11 cooperating therewith to successively supply cartons 12 to flights 13 of the flight conveyor 15, conveying the cartons for folding and closing, as will hereinafter more clearly appear as this specification proceeds.

The carton 12 may be a rectangular thin walled carton particularly adapted to package bakery goods, such as doughnuts and the like. The carton 12 has a hinged lid 16 having an end flap 17 projecting from said lid beyond the end of the carton and leading and trailing side flaps 18 and 19 respectively, adapted to be folded along the leading and trailing ends of the carton. The side flaps 18 and 19 project beyond the front wall of the carton in the form of tabs which are folded inwardly therealong to be maintained in position by strips of quick setting glue, such as hot melt glue, spaced along the underside of the end flap 17, upon folding of said end flap over said tabs and the front wall of the carton, as will hereinafter more clearly appear as this specification proceeds.

The carton folding and closing apparatus in addition to the supply conveyor means 10, the timer 11 and flight conveyor 15, includes generally a folding plate 21 extending over the top of the traveling carton and parallel to the material carrying run of the flight conveyor 15, a folding plow 22 extending over and along the folding plate 21 and downwardly toward said plate and in advance thereof, for folding the lid 16 over said plate and retaining the lid in downward relation with respect to the top of the carton. The apparatus also includes a series of leading flap folding arms 23, having folders 24 thereon for folding the leading side flaps 18 downwardly along the leading ends of the carton and retaining said flaps in folded relation for a partion of the travel of the carton along the conveyor. The apparatus further includes trailing flap folding arms 25 having folders 26 thereon facing the folders 24 and folding the trailing side flaps 19 along the trailing ends of the cartons and retaining said flights in position for a portion of travel of the carton. The apparatus further includes a folding plow 27 folding the projecting end of the leading side flap 18 along the front wall of the carton and retaining the flap in position, a trailing flap folder 29 movable to fold the projecting end portion of the trailing side flap 19 along the front of the carton, a glue applicator roll 30 and a pressure roll 31 disposed thereabove, for effecting the intermittent application of glue in strips to the underside of the flap 17. The closing apparatus further includes a guide plate 32 guiding the carton and retaining the flaps into engagement with the front wall thereon, and a front folding plow 33 folding the glued flap 17 along the front wall of the carton, together with a pressure roller 35 retaining the flap to the inturned ends of the leading and trailing flaps 18 and 19, and to the front wall of the carton until setting of the glue as the carton passes thereby.

The carton folding and closing machine, including the supply conveyor means 10, is mounted on a main frame 36, extending for the length of the supply conveyor means 10 and the carton folding and closing mechanism. The main frame 36 includes parallel spaced side frame members 37, 37 extending therealong and rearwardly of the folding and closing mechanism and forming an outboard support for the supply conveyor means 10 and a drive sprocket 39 for the flight conveyor 15. The outboard support is adjustably supported in vertically spaced relation with respect to the ground as by a yoke 40.

The supply conveyor means includes two spaced conveyor belts 41 and 42 having material carrying runs extending in the plane of the material carrying run of the flight conveyor 15 and along opposite sides of said flight conveyor for a portion of the length of travel thereof.

The supply conveyor means also includes an intermediate conveyor belt 43 extending in the plane of the conveyor belts 41 and 42 about a direction changing pulley 44 pinned or otherwise secured to a transverse shaft 45, to and about a pulley 46 at the incoming side of the flight conveyor 15 and freely mounted on a transverse shaft 47, suitably mounted on a side frame member 37 and extending inwardly therefrom.

The conveyors 41, 42 and 43 may be made from a suitable fabric material or from rubber or a rubber and fabric composition having a relatively rough material carrying surface, and are driven together to successively supply cartons to the flights 13 of the flight conveyor 15 under the control of the timer 11. As shown in FIGURE 9 the conveyor 41 is wider than the conveyors 42 and 43 and extends from a pulley 48 keyed or otherwise secured to the shaft 45, along a support plate 49 to and about a drive pulley 50, on a drive shaft 51.

Figures 10, 11:
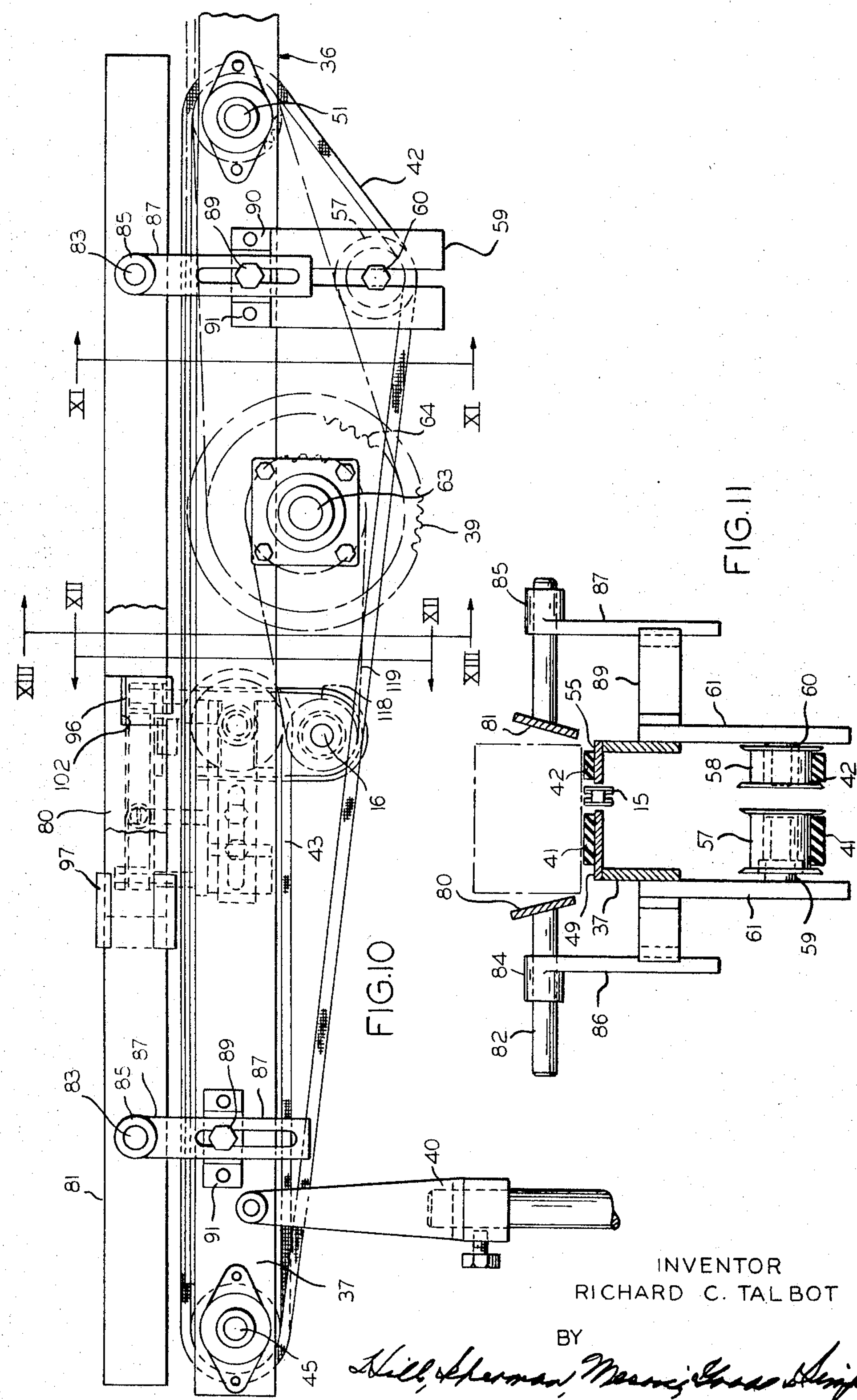
FIGURE 10 is a fragmentary view in side elevation of the carton supply and feeding apparatus, with certain parts broken away.
FIGURE 11 is a fragmentary transverse sectional view taken substantially along line XI—XI of FIGURE 10.
Figure 12:
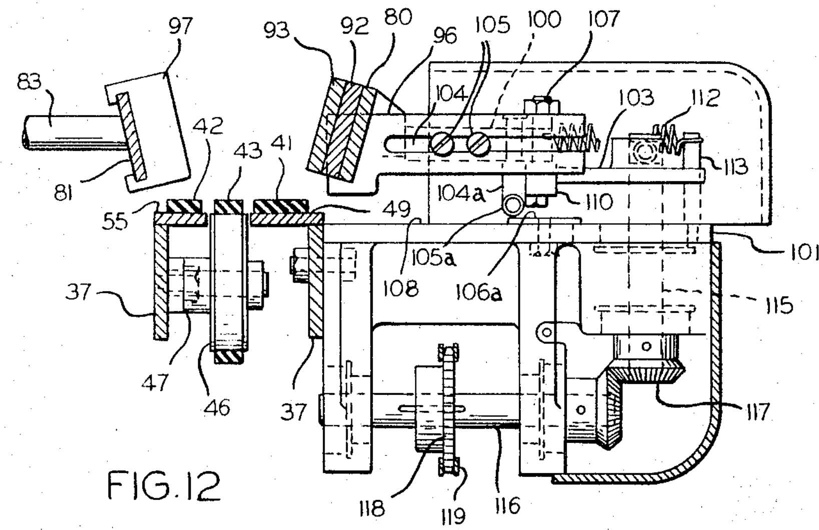
FIGURE 12 is a fragmentary transverse sectional view taken substantially along line XII—XII of FIGURE 10 with certain parts broken away.
Figure 13:
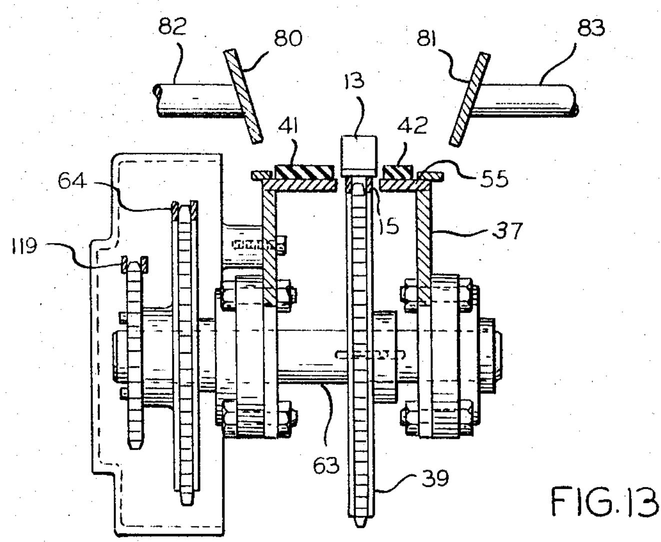
FIGURE 13 is a fragmentary transverse sectional view taken substantially along line XIII—XIII of FIGURE 10 with certain parts broken away and certain other parts removed.

The belt conveyor 42 changes its direction of travel about a pulley 53 keyed or otherwise secured to the shaft 45, along a plate 55 to and about a drive pulley 56 keyed or otherwise secured to the shaft 57. The lower runs of the conveyors 41 and 42 are shown as extending under tension idlers 57 and 58 respectively. The tension idlers 57 and 58 are shown in FIGURE 11 as being mounted on individual shafts 59 and 60, adjustably mounted in the slots of slotted plates 61, 61 depending from the side frame members 37, 37. The drive shaft 51 and drive pulleys 50 and 56 are driven from a drive shaft 63, supporting the sprocket 39 between the side frame members 37, 37 and driven from said sprocket. A chain and sprocket drive 64 connects the shaft 63 with the shaft 51 and drives said shaft and the pulleys 50 and 56 from the flight conveyor 15.

The flight conveyor 15 shown as being a chain type of flight conveyor having spaced flights 13, attached to certain links of the chain and extending upwardly therefrom along the material carrying run of the conveyor.

The flight conveyor 39 is trained about a drive sprocket 65 at its discharge end, keyed or otherwise secured to a drive shaft 66 extending across the frame 36 and suitably journalled therein. A sprocket 67 is keyed or otherwise secured to the drive shaft 66 intermediate the ends thereof and is driven from an endless drive chain 69. The chain 69 passes around and angularly downwardly of the sprocket 67 under vertically spaced tension idlers 70, 70 to and around a sprocket 71 keyed or otherwise secured to a transverse shaft 72. The transverse shaft 72 has a sprocket 73 keyed or otherwise secured thereto, driven from a sprocket 74 keyed or otherwise secured to a transverse shaft 75. An endless chain 76 drivingly connects the sprocket 74 to the sprocket 73. The transverse shaft 75 in turn is driven from a pulley 78 of a motor 77 through a belt drive 79. The motor 77 may be a conventional electric motor adjustably mounted on the main frame 36 to maintain the belt drive 79 under the proper tension. The motor pulley 78 may be a conventional form of variable speed pulley, operable to vary the speed of the apparatus as required.

Extending above and along the plates 49 and 50 are outwardly flared guides 80 and 81, flared outwardly of the respective belts 41 and 42. The guides 80 and 81 are shown in FIGURES 9, 10 and 11 as being welded or otherwise secured to the inner ends of longitudinally spaced rods 82 and 83 respectively. The rods 82 and 83 in turn are adjustably mounted in bosses 84 and 85 for adjustable movement toward and from each other, to adjust the guides in accordance with the width of carton being folded and closed. The bosses 84 and 85 in turn are mounted on the upper ends of slotted brackets 86 and 87 respectively, on machine screws or bolts 88 and 89, adjustably securing said brackets to support brackets 90 and 91 secured to and extending outwardly of the side frame members 37, 37 of the main frame 36. The guides 80 and 81 may thus be vertically adjusted with respect to the plates 49 and 55 and also may be adjustably moved toward and from each other in accordance with the width of carton being loaded. Set screws or thumb screws (not shown), may be provided to lock the rods 82 and 83 in position in the respective bosses 84 and 85, in a conventional manner.

The guide 80 is shown in FIGURES 1 and 9 as being flared and extending from the entering end of the belt conveyor means 10 to a spacer block 92. A flared guide strip 93 laps the spacer block 92 and extends therefrom along the belt conveyor 41 to the discharge end thereof. The block 92 and end of the guide strip 93 form a stop 95, adapted to be engaged by cartons on the supply conveyor means 10, and limit movement thereof to thereafter be pushed from the stop 95 by a pusher 96 of the timer 11, as will hereinafter more clearly appear as this specification proceeds.

A deflector 97 is mounted on the guide 81 rearwardly of the stop 96 and has an entering inclined deflector face 99 engaging the leading ends of cartons movable along the carton supply conveyor means 10 and deflecting the cartons into engagement with the stop 95. The deflector 97 may be adjustably mounted on the guide 81 for movement along said guide in accordance with the length of the cartons being folded and closed and is so spaced with respect to the stop 95 as to engage the trailing portion of the forward wall of the carton when the leading end thereof is in engagement with the stop 95. The pusher 96 is guided in a guide slot 102 in the guide 80 and has a slot 104 extending therealong forming an adjustable mounting means for mounting said stop on a drive block 100. Machine screws 105 are provided to adjustably connect said pusher to said block. A leg 104*a* depends from the block 100 and has a roller 105*a* on its lower end engaging a bearing pad 106*a* and supporting the rear end of the pusher on said pad. An actuator arm 106 is pivotally mounted on the block 100 on a pivot pin 107. The actuator 106 is pivotally mounted on a plate 108, closing the top of the housing 101, on a vertical pivot pin 109 suitably mounted on said plate and extending upwardly therefrom. A follower roller 110 is rotatably mounted on the actuator arm 109 on a pivot pin 111. A tension spring 112 connected between the arm 106 and stationary connecting pin 113, extending upwardly of the plate 106, is provided to maintain the follower roller 110 in engagement with the cam 103.

The cam 103 is keyed or otherwise secured to the upper end of a vertical drive shaft 115 extending downwardly into and suitably journalled in the housing 101. The drive shaft 115 is driven from a horizontal transverse shaft 116 through mitre gears 117. The shaft 116 has a sprocket 118 keyed or otherwise secured thereto, driven from the shaft 63 through a chain and sprocket drive 119.

The timer cam 103 is thus driven from the flight conveyor 15 in timed relation with respect to said flight conveyor and moves the pusher 96 through the guide slot 102 in the guide 80 once during each cycle of rotation of said timer cam. The inclined face 99 of the deflector 97 deflects the cartons into engagement with the stop 95 and as the peak of the cam rides along the follower roller 110, the pusher 96 will be extended to push the carton past the stop 95 onto the belt 41, to be carried by said conveyor belt and the conveyor belts 42 and 43 to the flight conveyor 15. The timing of operation of the pusher 96 with respect to travel of the flights 13 of the flight conveyor 15 is such that a carton is released from the stop 95, and follows directly behind a conveyor flight 13 to be picked up by the next succeeding flight and be carried to the folding plow 22, folding the lid 16 downwardly over the folding plate 21.

Figure 14:
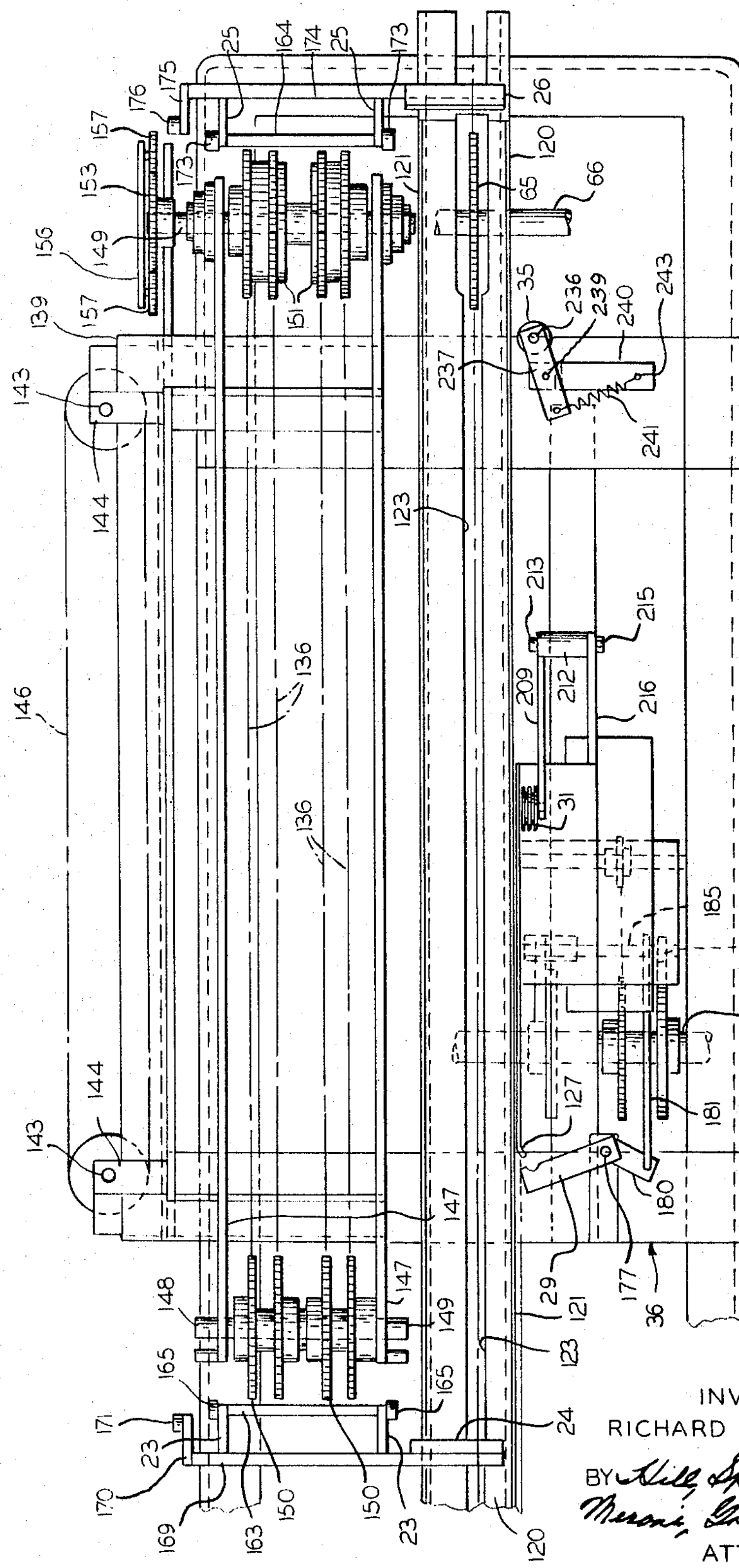
FIGURE 14 is a fragmentary plan view of the carton folding and closing apparatus with certain parts broken away and certain other parts removed.
Figure 15:
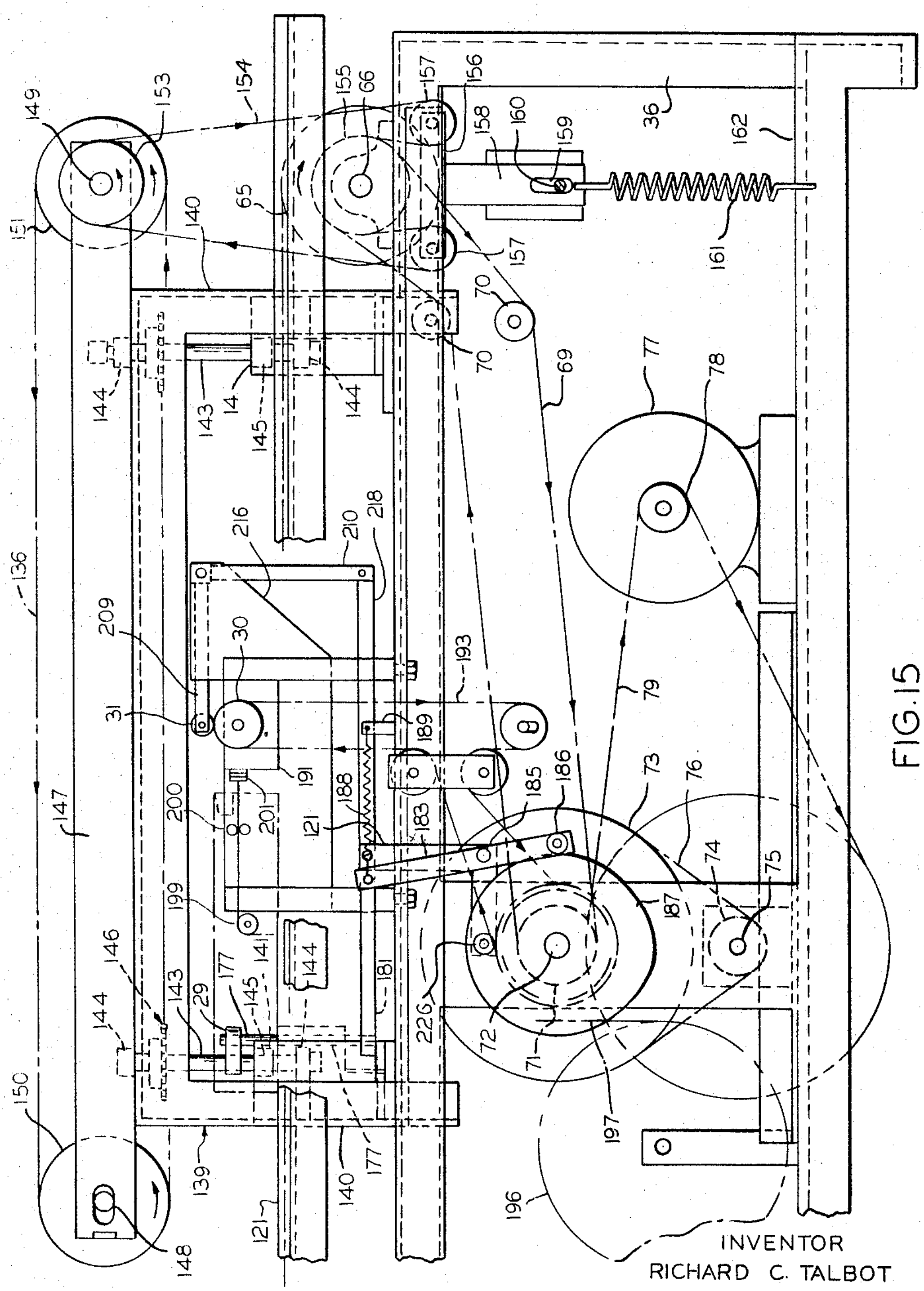
FIGURE 15 is a view in side elevation of the carton folding and closing apparatus shown in FIGURE 14 with certain parts broken away.
Figure 16:
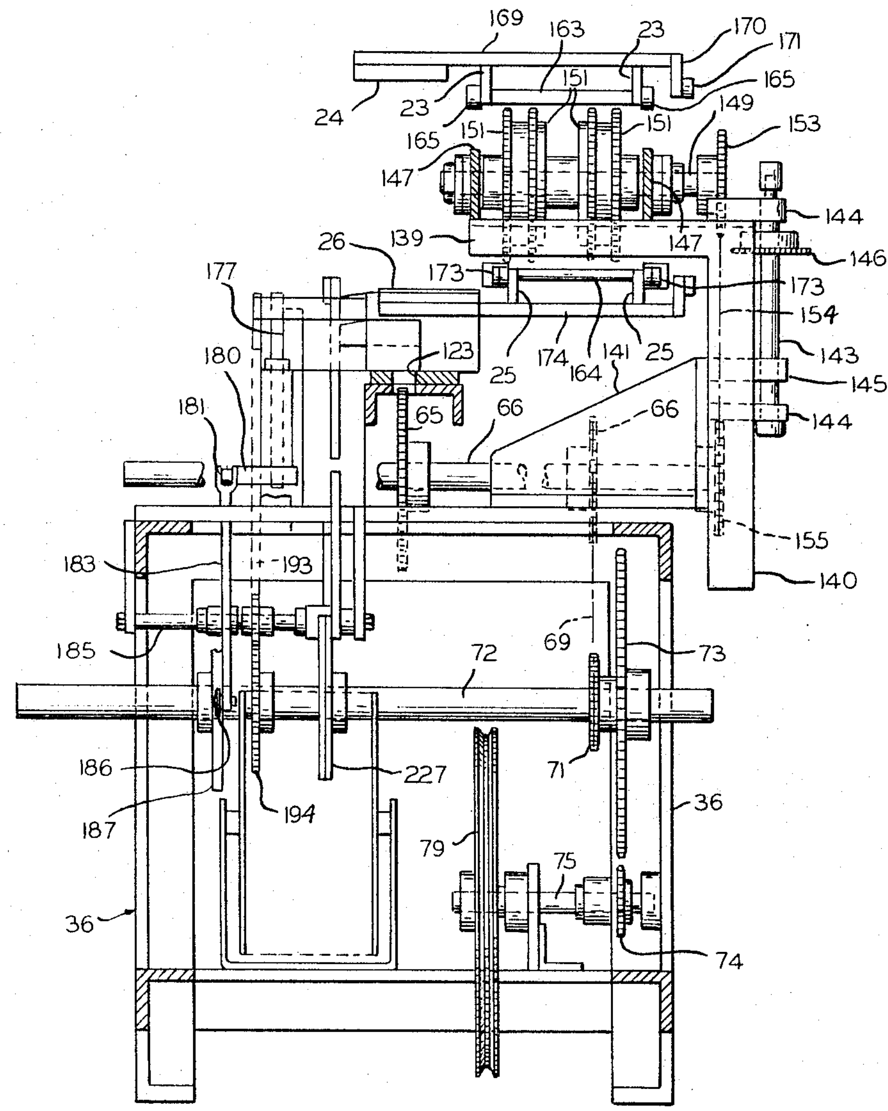
FIGURE 16 is an end view of the carton folding and closing apparatus shown in FIGURES 14 and 15 looking at the discharge end thereof, showing certain parts in transverse section.

The carton 12 is conveyed from the guides 81 and 93 by the flight conveyor 15 to an aligned channel 120 formed by a stationary front guide 121 and a movable rear guide 122. The bottom of the channel 120 is slotted as indicated by reference character 123 in FIGURE 14 to accommodate the flight conveyor 15 and flights 13 to move therealong and convey the carton along said channel along its various folding and closing stages. The adjustable guide 122 is vertically and laterally adjustable in accordance with the width and height of the carton being folded and closed. As diagrammatically shown in FIGURE 1 the adjustable guide 122 is mounted on longitudinally spaced supports 124, 124 adjustably moved toward and from the stationary guide 121 by shafts 125, 125 having threaded engagement with screws (not shown) connected with the support. The shafts 125 are suitably connected together to effect adjustment of the guide 122 toward and from the guide 121. Vertical adjustment of the adjustable guide 122 is effected by operation of a longitudinally extending shaft 126, which may be operated by a hand crank or a hand wheel (not shown) and may operate a worm and nut adjustment means (not shown). The means for adjusting the movable guide 122 toward and from the stationary guide 121 and the means for adjusting the elevation of said movable guide may be of any conventional form, and are no part of the present invention so need not herein be shown or described further.

The folding plow 22 is mounted on the adjustable guide 122 on a bracket 127 extending laterally and upwardly of said guide, and on a rod 129 welded or otherwise secured to said plow and adjustably mounted in the upper end portion of said bracket. A forwardly spaced bracket 130 serves to adjustably support a rod 131 extending across the channel 120 and having a rod 132 depending therefrom and welded or otherwise secured to the folding plow 22 in advance of the bracket 127. The folding plow 22, as shown in FIGURES 1 and 2 extends angularly over the folding plate 21 across the channel 120 in a downwardly inclined direction and has a horizontal extending terminal end portion 133 extending parallel to the bottom of the channel 120 and the folding plate 21 and spaced just above said folding plate to retain the lid 16 in its downwardly folded position as the lid is carried by the conveyor 15, for folding the leading and trailing end flaps 18 and 19 thereof downwardly along opposite sides of the carton. A hold down guide 135 is spaced in advance of the horizontal terminal end portion of the folding plow 22, to retain the lid in its downwardly folded position along the open top of the carton, during the end folding and glueing operations performed thereon.

As the carton is passing the terminal end portion 133 of the folding plow 22, the folder 24 comes into engagement with the leading flap 18 to fold the flap downwardly along the leading end of the carton, as shown in FIGURES 3 and 4. The trailing end folder 26 will then come downwardly into engagement with the trailing flap 19, to fold the flap 19 downwardly along the trailing end wall of the carton. The two folders 24 and 26 will then travel with the carton during folding of the end tabs of the flaps 18 and 19, inwardly along the front wall of the carton, and until said tabs are positively held in position by the front tab folder 27, as shown in FIGURE 6.

The leading and trailing end folders 24 and 26 and the respective folder arms 23 and 25, carrying said folders, are moved downwardly into engagement with the end flaps of the carton, and outwardly out of the way of the carton at the termination of the end folding operation, by a plurality of parallel spaced endless chains 136, disposed above and to one side of the channel 120, and a cam track 137 disposed to one side of said endless chains.

As shown in FIGURES 14, 16, 19 and 20, the endless chains 136 have bottom runs extending parallel to the bottom of the channel 20 and spaced thereabove and to one side thereof and are supported in a frame structure 139 supported on the frame 36 for vertical adjustment with respect thereto on depending legs 140. The depending legs 140 are slidably guided in support bracket 141, 141 extending outwardly of the frame 36 and are adjustably moved along said brackets in accordance with the height of carton being loaded by adjustment screws 143 rotatably mounted in vertically spaced support bosses 144, extending laterally outwardly of the frame structure 139 and threaded in nuts 145 extending laterally outwardly of the guide brackets 141 and secured thereto. The adjustment screws 143 are connected together by a chain and sprocket drive 146.

The frame structure 139 includes a pair of parallel spaced side frame members 147 suitably connected together and having an idler shaft 148 extending thereacross adjacent one end thereof and journalled therein, and a drive shaft 149 extending thereacross adjacent the opposite end thereof and journalled therein.

The idler shaft 148 has two pairs of connected idler sprockets 150 mounted thereon, about which the endless chains 136 change their direction of travel to carry the folders 24 and 26 to fold the flaps 18 and 19 downwardly along the leading and trailing sides of the carton. The drive shaft 149 has two pairs of sprockets 151, 151 keyed or otherwise secured thereto and in alignment with the idler sprockets 150, 150. The drive shaft 149 has a sprocket 153 on the outer end thereof meshing with an endless chain 154 trained thereabout and extending downwardly therefrom about a sprocket 155 keyed or otherwise secured to the shaft 66 and driven therefrom.

A takeup is provided for the chain 154 to accommodate vertical adjustment of the frame structure 139 and folders 24 and 26 with respect to the channel 120. The takeup is herein shown as being in the form of a takeup yoke 156 having idlers 157, 157, rotatably journalled therein at opposite sides of the sprocket 155 and meshing with the incoming and outgoing runs of the endless chain 154, as said chain passes about and is driven from the drive sprocket 155. The yoke 156 includes a stem 158 suitably guided in the frame structure 36 and having a lower vertically extending slotted portion 159, through which extends a clamping screw 160, serving to hold the yoke 156 in position and the drive 151 under the proper tension. A tension spring 161 is connected between a frame member 162 of the frame structure 36 and the stem of the yoke 156 to retain the drive chain 151 in mesh with its sprockets 153 and 155 upon loosening of the clamping screw 160, as the frame structure 139 is vertically adjusted in accordance with the required vertical spacing of the folders 24 and 26 with respect to the plane of the channel 120. Upon adjustment of the frame structure 139, the clamping screw 160 is tightened to the stem of the yoke, to hold the drive chain 151 under proper tension.

The endless chains 136, 136 have leading folder plates 163 and spaced trailing folder plates 164 extending thereacross beyond the outer chains 136 and attached to said chains to travel therewith. The leading plates 163 form pivotal mountings for the leading folding arms 23 and have spaced rollers 165 extending beyond opposite ends thereof and mounted thereon for movement along bottom tracks 166 extending generally parallel to the bottom of the trough 120 and maintaining the plate 163 in parallel relation with respect to travel of the carton, during a carton folding operation. The rollers 165 also ride along top rails 167, spaced inwardly of the cam track 137 and supporting the associated plate along the top return run of the endless chains 136.

Each leading plate 163 has the folder arms 23 pivotally mounted thereon for movement about the axes of the leading rollers 165 and extending in advance of said plate. The folder arms 23 have a folder flight 169 extending thereacross and laterally beyond opposite endless chains 136, 136. The folder flight 169 extends over the channel 120 and has a folder 24 mounted thereon in position to face toward a traveling carton as the folder flight passes about the idler sprocket 150 and the folder leads the carton. The folder flights 169 are welded or otherwise secured to the folder arms 23, 23 and are shown in FIGURE 22 as extending at obtuse angles with respect thereto.

Figure 20:
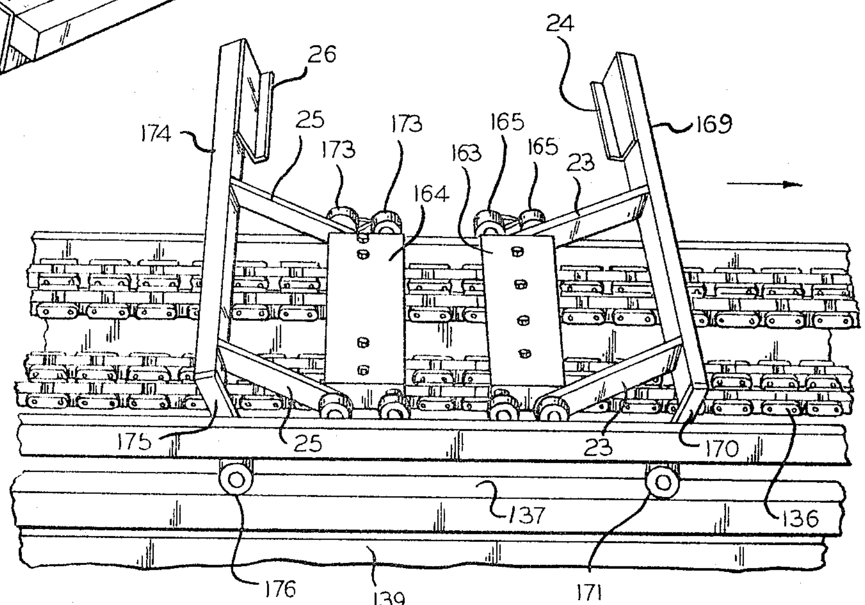
FIGURE 20 is a fragmentary perspective view illustrating the end folding flights traveling along the upper runs of the drive therefor, in position to effect a carton end folding operation, and looking at the machine from the opposite side thereof from FIGURE 18.

Extending from the opposite ends of the folder flights 169 from the folders 24 are cam arms 170, shown in FIGURE 20 as being welded or otherwise secured to the folder flights 169 and extending toward the conveyor chains 136 in alignment with the associated folders and extending in an opposite direction from said folders.

Figure 19:
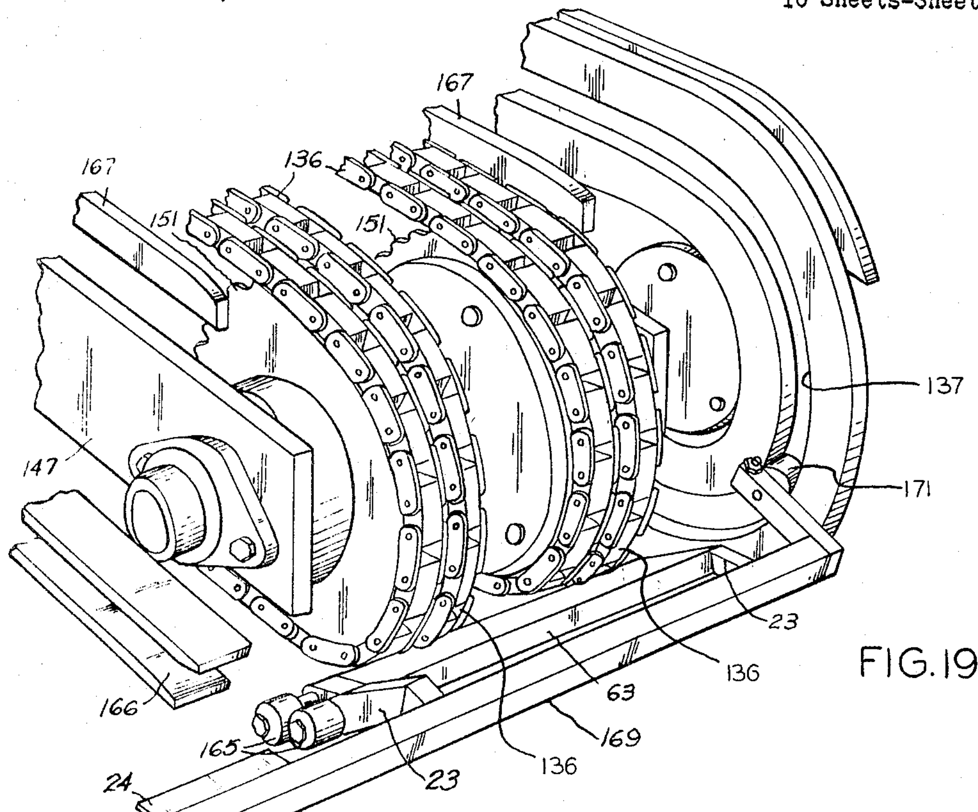
FIGURE 19 is a perspective view of the end folding conveyor showing the folding flights passing upwardly along the direction changing sprockets at the retreating travel of the flights, to accommodate an end folded carton to pass thereby.

Follower rollers 171 are mounted on the outer sides of the cam arms 170 and ride along the cam track 137 during the entire path of orbital travel of the endless chains 136. The cam track 137 is shown in FIGURE 19 as being at the opposite side of the chains 136 from the trough or channel 120.

Figure 21:
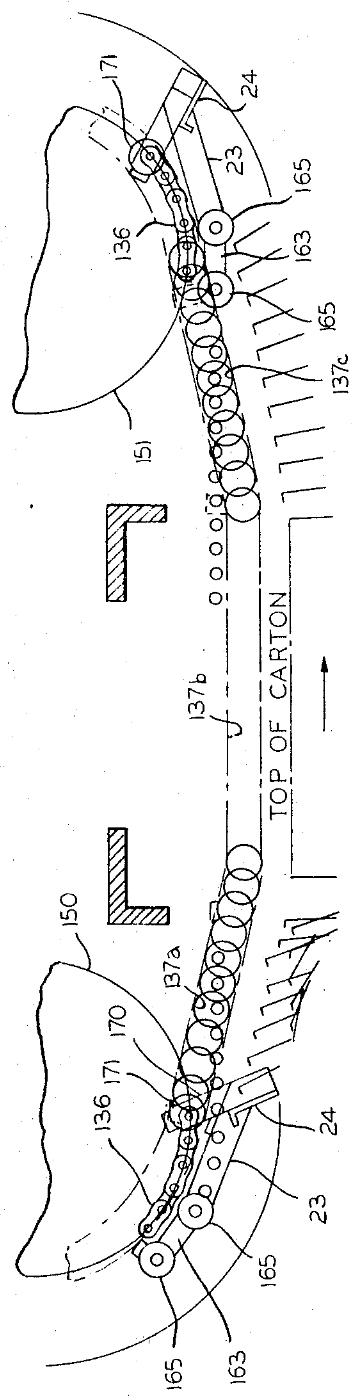
FIGURE 21 is a diagrammatic view showing the paths of travel of the leading end flap folders.
Figure 22:
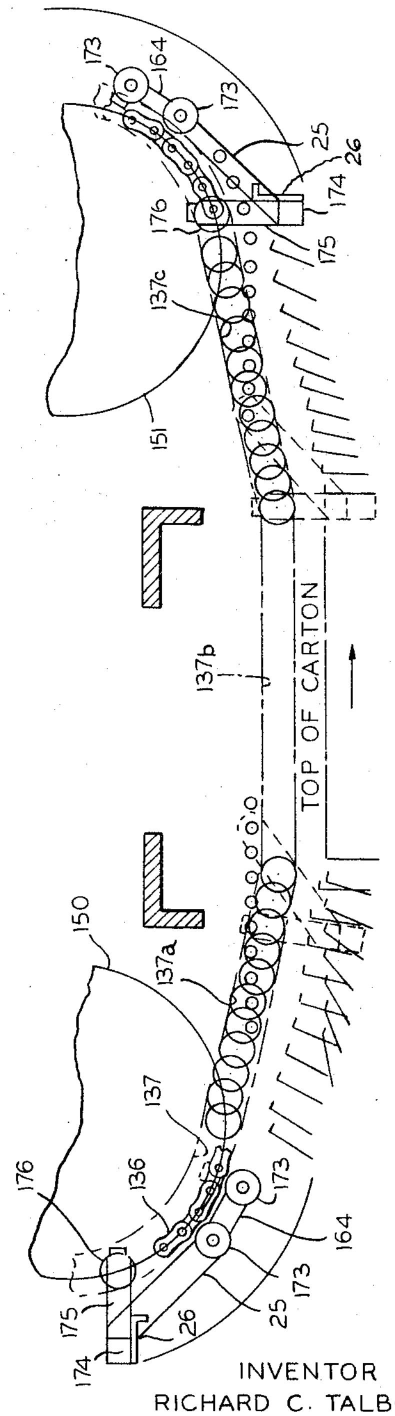
FIGURE 22 is a view similar to FIGURE 21 but showing the paths of travel of the trailing end flap folders moving into folding engagement with the trailing end flaps of the carton and releasing the flaps as the end tabs thereof are folded into engagement with the front of the carton.

The cam track 137, as partially shown in FIGURES 21 and 22, generally conforms to the paths of orbital travel of the endless chains 136, 136, except as said endless chains leave the idler sprockets 130 and pass to the drive sprockets 151, as the folders 24 are withdrawn from the carton. The cam track 137 toward the outgoing sides of the sprockets 150 changes from an arcuate track generally conforming to the paths of travel of the sprockets to a downwardly inclined track portion 137$^a$ terminating into a horizontal track portion 137$^b$ extending along the top of the carton in vertically spaced relation with respect thereto. This will cause the cam arm 170 to extend the folder arms 23 with respect to the plate 163 toward the chains 136 and will open the folders 24 to accommodate the carton to pass to an associated folder. The inclined portion of the cam track will then move the folders downwardly into engagement with a flap 18 to fold the flap 18 downwardly along the leading wall of the carton and to hold the flap into engagement with the leading wall of the carton when the roller 171 passes to the horizontal portion of the cam track. The folder will then travel with the carton retaining the flap in its downwardly folded position until the cam roller passes to an upwardly inclined portion 137$^c$ of the cam track 137 at the incoming side of the drive sprockets 151. This upwardly inclined portion of the cam will gradually withdraw the folders from the carton and completely withdraw the folders 24 from the path of travel of the carton as the cam rollers move into the arcuate portion of the cam track, as shown in FIGURE 21.

The trailing plates 164 like the leading plates 163, have spaced rollers 173 extending from opposite ends thereof and traveling along the lower track 166 and the top rails 167. The folder arms 25 are pivoted to the plate 64 for movement about the axes of the trailing rollers 173 and trail the associated plate 164 as said plate passes along the upper run of the chains 136 and downwardly about the idler sprocket 150. A flight 174 is shown as extending across the folder arms 25 at obtuse angles with respect to said arms. The flights 174 extend laterally beyond the outer endless chains 136. One end of each flight 174 extends over the channel 120 and has a trailing end folder 26 mounted thereon. The opposite end of the flight 174 has a cam arm 175 extending therefrom in generally parallel relation to the associated folder 26. A follower roller 176 is mounted on the free end of the cam arm 175 and extends outwardly therefrom for movements along the cam track 137.

The follower rollers 176 cooperate with the cam track 137 to retain the folders 26 out of the paths of travel of the cartons along the channel 120 and to move the folders 26 downwardly into engagement with the trailing flaps 19, as shown in FIGURE 5, and fold the flaps 19 along the trailing walls of the cartons and retain the flaps into engagement wtih the trailing walls of the cartons as the rollers 174 travel along the horizontal portion of the cam track. The cam track and rollers 176 will then withdraw the folders 26 from the end flaps of the cartons as the rollers pass onto the upwardly inclined portion of the cam track, and the chains 136 pass to the incoming sides of the sprockets 151 to free the cartons from the folders and accommodate free travel thereof for glueing and folding down of the flap 17.

As the leading end flap 18 is folded downwardly along the advance wall of the carton, the front end folder 27 will come into engagement with the projecting tab of the flap and fold the tab inwardly along the front wall of the carton. The front end tab folder 27 may be mounted on the stationary guide 121 in outwardly spaced relation with respect thereto, and extends parallel thereto.

As the advance end portion of the downwardly folded carton lid 16 leaves the terminal end portion 133 of the folding plow 22, the lid will pass under the hold down rail 135, holding the lid down during downwardly folding of the flaps 18 and 19 thereof and inward folding of the end tabs thereof.

The back flap folder 29 is shown as being mounted on a vertical rock shaft 177 suitably journalled in the main frame 36 for rocking movement with respect thereto about a vertical axis spaced outwardly of the stationary guide 121. The rock shaft 177 has a rock arm 180 secured thereto adjacent the lower end thereof and extending outwardly of said shaft. A link 181 is pivoted to the outer end portion of the rock arm 180 and is pivotally connected at its opposite end to the upper end of a lever arm 183. The lever arm 183 is pivoted intermediate its ends on a transverse shaft 185 and has a follower roller 186 on its lower end engageable with a cam 187 on the shaft 72. A tension spring 188 connected between the upper end of the lever arm 183 and the fixed connector 189 connected to the frame 36 for the machine. The cam 187 is so formed and its speed of rotation is such that as a downwardly folded trailing end flap approaches the folder 29, the cam profile will pivot the lever 183 in a counterclockwise direction and pivot the rock arm 180, rock shaft 177 and end tab folder 27 in a clockwise direction to tuck the projecting end tab of the carton along the front wall thereof.

As the tab extending from the end of the carton is folded to extend along the front wall of the carton, the front end folder 27 will engage the leading end of the tab and hold the tab in folded relation with respect to the carton. During this operation the lid will be held in its closed position by the hold down 135. As the tabs extending from the ends of the flaps 18 and 19 are folded inwardly along the front wall of the carton the flap 17 will pass over a retainer 190, retaining the flap 17 in spaced relation with respect to the glue roller 30, as the flap passes thereover.

The glue roller 30 is rotatably mounted to rotate in the direction of travel of the carton into and out of a glue pot 191 disposed therebeneath and is positively driven by a chain and sprocket drive 193 driven from the sprocket 194 on the transverse shaft 72. A takeup idler 195 is provided to maintain the chain of the chain and sprocket drive under the proper tension.

The glue pot 191 contains a hot melt glue and resistor heaters (not shown) for melting the glue. The hot melt glue is supplied from a reel 196 in the form of a strip or rope 197. The rope of glue 197 passes upwardly from the reel 196 over an idler 199 disposed above the reel and passes from the idler 199 between a pair of meshing gears 200 feeding the rope to the glue pot 191 to be melted therein. The gears 200 may be rotatably driven from the chain and sprocket drive 193 in a suitable manner, which is no part of the present invention, so need not herein be shown or described further.

The hot melt glue is a commercial article of manufacture, as is the feeding of the glue in the form of a rope by gears into the glue pot, conventional. The details of the feeding means for the glue rope 197, the glue pot and the resistor heaters for heating the glue therefore need not herein be shown or described further.

In FIGURE 17 I have diagrammatically shown the rope of glue 197 as being trained upwardly and over an idler 199, between gears 200 supplying the rope of glue through a heat transfer collar 201 to the glue pot 191, to be melted therein and applied to the undersurface of the flap 17 of the carton 12.

The glue roller 30 has spaced rims 205, 205 having cylindrical peripheries with a gap 206 therebetween for picking up the glue in strips for application to the underside of the flap 17.

The pressure roller 31 has three spaced rims 207 having cylindrical peripheries. The central rim 207 registers with the space 206 between the rims 205, 205 while the outer rims 207 are spaced outwardly of said rims. Thus as the pressure roller 31 comes downwardly into engagement with the top surface of the flap 17, the flap will be placed into engagement with the rims 205, 205 of the glue roller 30, to apply parallel strips of glue thereto.

The pressure roller 31 is mounted for free rotation on a shaft 208 extending outwardly of a lever arm 209 of a bell crank 210. A nut 211 threaded on the inner end of the shaft 208 serves to retain said shaft and pressure roller to the lever arm 209. The bell crank 210 includes a rectangular spacer 212 pivotally mounted on a pivot shaft 213 and having the arm 209 welded or otherwise secured thereto. A nut 215 threaded on the outer end of said shaft 213 retains said shaft to a plate 216, secured to the stationary guide 121 in forwardly spaced relation with respect thereto. The spacer 212 has a lever arm 217 depending therefrom, having a link 218 pivotally connected to its lower end on a pivot pin 219. The link 218 is shown as being a turnbuckle type of link enabling the link to be adjusted, and is pivotally connected at its opposite end to an upright lever arm 220 of a bell crank 221 on a pivot pin 222. The bell crank 221 is pivotally mounted on the main frame 36 for rockable movement about a transverse axis, on a shaft 223. The bell crank 221 has a horizontally extending lever arm 225 having a follower roller 226 on the end thereof, riding along a cam 227 mounted on the shaft 72 and rotatably driven thereby. A tension spring 229 is connected between the lever arm 220 and a fixed pin 230 to maintain the follower roller 226 in engagement with the surface of the cam 227.

The cam 227 is shown as having three lobes 231 spaced 90° apart to raise the follower roller 226 three times during each cycle of rotation of the cam 227, and to thereby apply pressure to the top surface of the flap 17 along opposite sides of the rims 205, 205 at three points along the flap as the carton passes by the glue roller 30. The speed of rotation of the cam 227 is timed with respect to the speed of travel of the carton 12 in such a manner that two parallel spaced strips of glue will be applied to the underside of the flap 17 along the advance end thereof, two other parallel strips of glue will be applied to the carton flap intermediate the ends thereof and two other parallel strips of glue will be applied to the carton flap along the trailing end portion thereof. As the flap 17 is bend downwardly along the front wall of the carton the advance glue strips will retain the flap 17 to the advance tab, the central glue strips will retain the flap 17 to the front wall of the carton, and the trailing glue strips will retain the flap 17 to the trailing tab. The application of pressure to the flap 17 will thus effect the glueing of the lid and the adhesion of the lid to the front wall of the carton.

The guide 32 is spaced in advance of the pressure roller 31 and retains the inwardly folded tabs of the flaps 18 and 19 to the front face of the carton, as the flap 17 is folded downwardly along the front face of the carton and also guides the flap 17 to be folded downwardly along the front face of the carton by the folding plow 33 spaced thereabove. The hold down guide 135 is spaced inwardly of the folding plow 33 and engages the top surface of the carton lid during downward folding movement of the flap 17 thereof and extends beyond the pressure roller 135. The flap folding plow 33 is welded or otherwise secured to a rod 233, adjustably mounted in a support bracket 235 for movement toward and from the stationary rail 121. The support bracket 235 in turn is suitably mounted on the frame 36 for vertical adjustable movement with respect thereto, to accommodate the elevation of the folding plow 33 to be varied in accordance with the height of carton being folded and closed. The mounting for the bracket 235 may be a clamping mounting in which a clamping screw (not shown) extends through a slotted portion of the bracket and retains the bracket in the desired position of elevation, like the mountings of the brackets 87 to the side frame members 37 of the frame 36.

The pressure roller 35 is journalled on a vertical shaft 236, mounted on and depending from a lever arm 237. The lever arm 237 is pivotally mounted on the frame 37 intermediate its ends on a vertical pivot pin 239. The pin 239 in turn is mounted on a bracket 240 spaced forwardly of the front guide 120 and mounted for vertical adjustable movement with respect thereto, in a manner similar to which the brackets 87, 87 are mounted on the side frame members 37. The adjustable connection is thus a conventional slotted and clamping connection, so the description thereof need not herein be repeated. A tension spring 241 is connected between the free end of the lever arm 237 and a pin 243 extending upwardly of the bracket 240 to maintain the pressure roller 35 in engagement with the downwardly folded flap 17, with sufficient pressure to effect setting of the glue as the carton passes thereby.

It should here be understood that the hot melt glue sets rapidly with very little pressure on the flap and provides a substantially instantaneous seal for the inwardly folded tabs to the front flap of the carton lid, and also provides a substantially instantaneous seal for the carton lid to the front wall of the carton, so that the carton is sealed in its folded and closed position as it passes by the pressure roller 35, and the pressure exerted by said pressure roller is merely sufficient to press the flap 17 into engagement with the inwardly folded end tabs of the flaps 18 and 19 and the front wall of the carton, without distorting the flap 17 or the front wall of the carton.

It may be seen from the foregoing that a new and improved apparatus has been provided to successively supply cartons to be picked up one by one, to have lid and flap folding operations performed thereon all while the carton is traveling, and that the application of hot melt glue to the front flap of the carton at intervals, not only seals the flaps to the lid to extend about the carton, but also instantaneously seals the lid to the front wall of the carton with very little pressure, all while the folded carton is passing along the pressure roller 35.

It may further be seen that the instantaneous sealing of the flap and lid to the front wall of the carton, with very little pressure, makes the apparatus particularly adapted to fold and close thin walled cartons of a type which may be filled with bakery goods during the folding and closing operation thereof without crushing or contaminating the bakery goods.

It may further be seen that I have provided an improved folded means for folding down the leading and trailing end flaps of the carton and holding these flaps in downwardly folded relation during travel of the carton along its conveyor, and that the folding means may readily be adapted for folding cartons of varying lengths, heights and widths.

It should here be noted that where it is necessary to adjust the end flap folders 24 and 26 for folding longer or shorter cartons, the leading folders 24 are always in the same position. It, therefore, is only necessary to adjust the trailing end folders 26 along the chain, so the folders 26 are spaced from the folders 24 a distance equal to the length of a carton when the cam rollers 176 are traveling along the horizontal portion 137$^b$ of the cam track. Adjustment is attained by adjusting the positions of the plates 164 along the endless chains 136, 136.

While I have herein shown and described one form in which the invention may be embodied, it may readily be understood that variations and modifications in the invention may be attained without departing from the spirit and scope of the novel concepts thereof.

I claim as my invention:

1. In a machine particularly adapted for folding and closing cartons, each of which cartons has a back wall and a forwardly spaced front wall with end walls connecting said front and back walls together, a lid hinged to said back wall having a front end flap extending forwardly of said front wall when said lid is in a closed position, said lid also having oppositely extending side flaps having tabs extending along the front end flap and separated from said front end flap, the improvements comprising:

carton conveying means conveying the cartons for folding and closing, means folding the lid of the moving carton on said conveying means downwardly over the carton, with the flaps and tabs extending horizontally beyond the margins thereof, other means folding said side flaps downwardly along the end walls of the carton to extend said tabs beyond the front wall of the carton, still other means folding the tabs inwardly along the front wall of the carton, a glue roller disposed beneath the forwardly extending front end flap and spaced therefrom, means supplying hot melt glue to said glue roller, pressure means spaced above said front end flap, power means operable in timed relation with respect to travel of the carton, and operatively connected with said pressure means and operating said pressure means to press and engage the under surface of said front end flap with said glue roller, to effect the application of glue to said flap, folding means folding said front end flap, with glue applied thereto, along the front wall of the carton and along the tabs extending inwardly along the front wall of the carton, and pressure means pressing on said downwardly folded front end flap to effect setting of the glue, and the sealing of said cover in a closed position.

2. The structure of claim 1, wherein means are provided for normally holding the front end flap out of engagement with said glue roller, and wherein said pressure roller presses said front end flap into engagement with said glue roller against said holding means.

3. In a carton folding and closing machine, particularly adapted to fold and close a carton having a hinged lid, a flap extending forwardly therefrom and oppositely extending side flaps extending in the plane of the lid, carton conveying means, means folding the lid of the carton downwardly over the carton with the flaps thereof extending horizontally, a glue roller disposed beneath the forwardly extending flap, means rotatably driving said glue roller to travel in the direction of travel of the carton, a pressure roller disposed above said glue roller in vertically alignment therewith, means normally holding the forwardly extending flap out of engagement with said glue roller, and power means operable in timed relation with respect to travel of the carton, for moving said pressure roller down into engagement with said flap at intervals and pressing said flap toward said glue roller at spaced intervals along said flap, to effect the application of glue to the underside of said flap at spaced intervals along said flap, for gluing said flap to the body of the carton.

4. In a carton folding and closing machine, particularly adapted to fold and close a carton having a hinged lid, a flap extending forwardly from the lid in the plane of said lid and oppositely extending side flaps extending in the plane of the lid, a carton conveying means conveying the carton at a predetermined speed for folding, gluing and closing, a glue pot disposed beneath said forwardly projecting flap, a glue roller partially immersed in said glue pot and extending thereabove, means rotatably driving said roller in the direction of travel of the carton to move into and out of said glue pot, a freely rotatable pressure roller disposed above said flap in vertical alignment with said glue roller and mounted for movement toward and from said glue roller, and power means operable in timed relation with respect to travel of said carton conveying means for successively moving said pressure roller to and from said glue roller to press said flap into engagement with said glue roller at the advance, central and rear end portions of said flap to effect the application of glue thereon to adhesively maintain the cover in a folded and closed position.

5. In a carton folding and closing machine, particularly adapted to fold and close rectangular upwardly opening cartons, each of which has a hinged lid, a flap extending forwardly from the lid and oppositely extending side flaps having tabs projecting along the forwardly extending flap, means folding the lid of the carton downwardly over the carton with the flaps in the plane of the lid, other means folding the side flaps downwardly to extend along the sides of the carton with the tabs thereof projecting beyond the ends of the carton, means moving the tabs inwardly along the front of the carton, means retaining the tabs in their inwardly folded positions, and means applying glue to the forwardly projecting flap at intervals comprising a glue pot disposed beneath said flap, a glue roller extending into said glue pot, power means for rotatably driving said glue roller to rotate out of said glue pot in the direction of travel of the carton, a pressure roller spaced above said glue roller in direct alignment therewith, a guide member extending beneath the flap and guiding the flap to pass in the space between said glue roller and said pressure roller and holding the flap out of engagement with said glue roller, a bell crank forming a movable mounting for said pressure roller, a continuously rotating cam, an operative connection between said cam and said bell crank to move said pressure roller downwardly to engage said flap with said glue roller at successive intervals during passage of said flap along said glue roller to effect the application of spaced strips of glue at the ends and central portion of said flap, means folding the glued forwardly projecting flap downwardly along the front wall of the carton, and pressure means pressing the glued forwardly projecting flap into engagement with said tabs and the front wall of the carton to adhesively maintain the carton in a closed condition.

6. A carton folding and closing machine in accordance with claim 5 wherein the folding means folding the front flap downwardly is in the form of a folding plow spaced advanced of said glue roller, and wherein the pressure means is a pressure roller pressing on the folded flap and maintaining the downwardly folded flap into engagement with said inwardly turned side flaps and the front wall of the carton, to secure the lid in a closed position by setting of the glue, as the carton passes by said pressure roller.

7. A carton folding and closing machine in accordance with claim 5 wherein the glue roller has a plurality of parallel spaced rims having cylindrical peripheries with a depression therebetween, and the pressure roller has a central rim having a cylindrical periphery movable into the space between said spaced rims and has outer rims movable along the outer sides of said spaced rims of said glue roller, to effect the application of glue to the flap in parallel spaced strips.

8. A carton folding and closing machine in accordance with claim 5 wherein the glue roller has spaced rims with a depression therebetween and the pressure roller has a central rim in alignment with said depression and movable in the space between said spaced rims, and outer rollers movable along the outer sides of said spaced rims to place pressure on said flap on opposite sides of said rims on said glue roller to effect the application of glue to the underside of said flap in parallel spaced strips, and wherein the folding means comprises a folding plow spaced in advance of said glue roller and folding the glued flap downwardly along the front of the carton, and pressure means comprises a pressure roller effecting the gluing of the flap to the inturned tabs of the side flaps and the body of the carton during passage of the carton along said pressure roller.

9. A carton folding and closing machine in accordance with claim 8 wherein the glue is a hot melt glue fed to the glue pot in strip form.

10. In a carton folding and closing machine, a carton supply conveyor, a flight conveyor forming a forward continuation of said supply conveyor and having spaced flights projecting therefrom, engaging behind a carton and progressing the carton for folding, gluing and closing, and means successively supplying cartons on said carton supply conveyor to said flight conveyor in timed relation with respect to travel of the flights thereof, comprising a carton stop spaced rearwardly of said flight conveyor, a deflector spaced rearwardly of said stop a distance less than the length of a carton and extending over said supply conveyor and successively deflecting the cartons on said supply conveyor into engagement with said stop and maintaining the cartons in engagement with said stop until positively released, and a pusher movable along said stop transversely of said supply conveyor and intermittently driven in timed relation with respect to said flight conveyor, to push successive cartons from said stop in the path of travel of said flight conveyor behind a flight thereon, to be engaged by the next succeeding flight of said flight conveyor and progressed thereby for folding, gluing and closing.

11. In a carton folding and closing machine, carton supply means including at least two laterally spaced belt conveyors having material carrying runs movable in the same horizontal plane, a flight conveyor movable in the space between said supply conveyors for a portion of the length of travel of said belt conveyors and extending therebeyond, said flight conveyor including an endless chain having a material carrying run in the plane of said belt conveyors and having spaced flights extending upwardly of said material carrying run, a carton stop disposed to one side of one of said belt conveyors and spaced rearwardly of said flight conveyor, a carton deflector spaced rearwardly of said stop a distance less than the length of a carton and extending over one of said belt conveyors and deflecting and maintaining cartons into engagement with said stop until positively released, a pusher movable inwardly along said stop for successively pushing cartons off said stop to be carried by said belt conveyors to said flight conveyor, and means driven by the means for driving said flight conveyor for successively moving said pusher inwardly along said stop in timed relation with respect to travel of said flight conveyor, to time the travel of cartons along said belt conveyors to be successively moved thereby onto said flight conveyor behind a flight thereon, to be picked up and carried for folding and closing by a next succeeding flight thereof.

12. A carton folding and closing machine in accordance with claim 11 wherein spring means are provided to retractibly move said pusher outwardly of said stop, and cam and follower means driven in timed relation with respect to travel of said flights are provided to move said pusher inwardly along said stop to successively push cartons to be carried by said belt conveyors to said flight conveyor into timed relation with respect to travel of the flights thereof.

13. In a carton folding and closing machine, carton supply means therefore comprising two laterally spaced belt conveyors having horizontally traveling conveying runs, a third belt conveyor between said two belt conveyors and movable for a portion of the length of travel thereof, a flight conveyor forming a forward continuation of said third belt conveyor and of said two laterally spaced belt conveyors and having a material carrying run in the plane of the material carrying runs of said belt conveyors, and having spaced flights extending vertically therefrom and spaced apart distances greater than the length of a carton, a stop extending over one of said belt conveyors adjacent the discharge end of said third belt conveyor, a deflector extending over an opposite belt conveyor of said two belt conveyors and deflecting cartons conveyed by said conveyors into engagement with said stop, a reciprocably movable pusher movable along said stop into and out of the paths of travel of said conveyors, and cam and follower means driven in timed relation with respect to travel of said flight conveyor for successively pushing cartons from said stop to be carried by said belt conveyors to said flight conveyor in timed relation with respect thereto, to effect the supply of a carton behind a flight of said flight conveyor to be picked up by a next succeeding flight thereof.

14. A carton folding and closing machine in accordance with claim 13 wherein the cam means for operating the pusher is driven by the flight conveyor in predetermined timed relation with respect to the speed of travel thereof, and wherein the deflector is in the form of a block having an inclined deflecting surface, inclined toward said stop and directing cartons to the opposite side of said conveyor from said stop.

15. In a carton folding and closing machine particularly adapted to fold and close a carton having a hinged lid having an end flap extending forwardly therefrom and oppositely extending side flaps, comprising means supplying and conveying cartons for folding, means closing the hinged lid of the carton, and means folding the side flaps of the lid downwardly over the sides of the carton while traveling comprising, a plurality of spaced endless chains disposed above and traveling in paths parallel to the paths of travel of the cartons, spaced leading and trailing flap folding means mounted on said endless chains, each including a plate extending across and secured to said chains, a folder arm transversely pivoted to said plate, a folder on the end of said folder arm extending across the path of travel of the carton, cam and follower means controlling movement of said folders and moving a leading flap folder to first fold down a leading end flap and then moving a trailing flap folder to fold down a trailing end flap and then holding the flaps along the front and rear walls of the carton for further folding.

16. In a carton folding and closing machine particularly adapted to fold and close a carton having a hinged lid having an end flap extending forwardly therefrom and oppositely extending side flaps having end tabs projecting from said side flaps, comprising means supplying and conveying cartons for folding, plow means closing the hinged lid of the traveling carton, other means traveling with the carton, folding the side flaps of the lid downwardly along the slides of the carton while traveling comprising, a plurality of spaced endless chains disposed above and having bottom runs traveling in paths parallel to the paths of travel of the carton, spaced leading and trailing flap folding means mounted on said endless chains, each including a plate extending across and secured to said chains, at least one folder arm transversely pivoted to said plate, a folder on the outer end of said folder arm, the leading folder arm and folder extending in advance of its associated plate and the trailing folder arm and folder trailing its associated plate, cam and follower means controlling movement of said folders and extending along the lower run of said endless chains and moving the leading folder to lead the carton and to move downwardly along the leading flap along the leading edge of the carton and moving the trailing folder to move angularly downwardly into engagement with the trailing flap and fold the flap along the trailing wall of the carton and holding said leading and trailing flap folders to retain said leading and trailing folders into engagement with the leading and trailing flaps for a portion of the travel of the carton, and then controlling said folders to move upwardly out of travel of the carton.

17. In a carton folding and closing machine, particularly adapted to fold and close a carton having a hinged lid having an end flap extending forwardly therefrom and oppositely extending side flaps having end tabs projecting forwardly therefrom, comprising a flight conveyor conveying cartons for folding, plow means closing the hinged lid of the traveling carton, and means folding the side flaps of the lid downwardly over the leading and trailing sides of the carton while traveling with said conveyor, comprising a plurality of spaced endless chains disposed above and traveling in paths parallel to the paths of travel of the carton, spaced leading and trailing flap folding means mounted on said endless chains including leading and trailing plates extending across said endless chains, a leading folder arm transversely pivoted to the leading plate and extending in advance thereof and having a flap folder extending laterally therefrom over the path of travel of the carton, a trailing folder arm transversely pivoted to the trailing plate and extending in trailing relation with respect thereto and having a folder extending laterally therefrom over the path of travel of the carton, a cam extending along said endless chains and having a downwardly inclined entering cam surface extending along the lower run of said endless chains, a horizontal holding surface forming a forward continuation thereof and an upwardly inclined withdrawal surface forming a forward continuation of said holding surface, cam arms extending from said folders at acute angles with respect to said folder arms and having follower rollers on the ends thereof movable along said cam track to effect movement of a leading flap folder to first fold down a leading end flap of the carton and to then effect movement of a trailing end flap folder to fold down the trailing end flap of the carton, and hold said end flaps to the leading and trailing end walls of the carton during travel of said followers along said holding surface of said cam track, and to then withdraw said folders from the carton during travel of said followers along the upwardly inclined withdrawal surface of said cam track.

18. In a carton folding and closing machine particularly adapted to fold and close a carton having a hinged lid having an end flap extending forwardly therefrom to be folded along a front wall of the carton and having oppositely extending side flaps to be folded along the leading and trailing slides of the carton, said side flaps having tabs projecting forwardly therefrom to be folded along the front wall of the carton, comprising.

a flight conveyor conveying cartons for folding, plow means closing the hinged lid of the traveling carton, and means folding the side flaps of the lid downwardly along the leading and trailing sides thereof while traveling on said conveyor comprising, a pair of spaced endless chains disposed to one side of and above said flight conveyor and having lower runs traveling in paths parallel to the paths of travel of the cartons on said flight conveyor, spaced leading and trailing flap folding means mounted on said endless chains, each including a plate extending across and secured to said chains, a folder arm transversely pivoted to said plate, a folder on the end of said folder arm extending laterally of said folder arm across said flight conveyor, cam and follower means controlling movement of said flights and folders and moving a leading folder to first fold down a leading end flap and then moving a trailing folder to fold down a trailing end flap and then holding the flaps along the leading and trailing ends of the traveling cartons, a front end tab folder extending along the front wall of a carton for engaging the projecting tab of a leading folded front end flap, and folding the tab along the front wall of a carton, a power driven oscillatably movable back tab folder spaced rearwardly of said front end folder and movable in timed relation with respect to travel of a carton, about a vertical axis disposed laterally outwardly of the path of travel of the carton, to engage the projecting tab of a trailing end flap and fold the tab forwardly along the front wall of a carton, to be retained thereto by said front end folder, as the carton is carried by said conveyor, means applying glue to the undersurface of the forwardly extending end flap of the carton, other means in advance of said glue applying means for folding the forwardly projecting end flap of the carton downwardly along the front wall thereof, and pressure means spaced in advance of said other folding means exerting pressure on the downwardly folded front end flap and gluing said flap to said end tabs and front wall of the carton.

19. In a carton folding and closing machine particularly adapted to fold and close a carton having a hinged lid, said lid having an end flap extending forwardly therefrom, to be folded along a front wall of the carton and having oppositely extending side flaps to be folded along the leading and trailing sides of the carton and having tabs projecting forwardly therefrom to be folded along the front wall of the carton, comprising, supply conveyor means, a flight conveyor extending along said supply conveyor means and therebeyond, a stop extending partially over said supply conveyor means, a deflector on the opposite side of said supply conveyor means from said stop and on the incoming side of said stop and successively deflecting and holding cartons in engagement with said stop, a pusher movable along said stop and pushing cartons from said stop to be carried to said flight conveyor, a cam operating said pusher in timed relation with respect to travel of said flight conveyor, plow means spaced in advance of said supply conveyor means folding down the hinged lid of the traveling carton, and means folding the side flaps of the lid downwardly along the leading and trailing sides of the carton while traveling on said conveyor comprising, a pair of spaced endless chains disposed to one side of and above said flight conveyor and having lower runs traveling in paths parallel to the paths of travel of the cartons on said flight conveyor, spaced leading and trailing flap folding means mounted on said endless chains, each including a plate extending across and secured to said chains, a folder arm transversely pivoted to said plate, a folder on the end of said folder arm extending laterally of said folder arm across said flight conveyor, cam and follower means controlling movement of said flights and folders and moving a leading folder to said first fold down a leading end flap and then moving a trailing folder to fold down a trailing end flap and then holding the flaps along the leading and trailing ends of the traveling cartons, a front end tab folder extending along the front wall of a carton for engaging the projecting tab of a downwardly folded leading front end and folding the tab along the front wall of a carton and retaining the tab thereto, a power driven oscillatibly movable back tab folder spaced rearwardly of said front end folder and movable in timed relation with respect to travel of said flap folders, about a vertical axis disposed laterally outwardly of the path of travel of the carton, to engage the projecting tab of a trailing end flap and fold the tab forwardly along the front wall of a carton, to be retained thereto by said front end folder, as the carton is carried by said conveyor and the flaps are held down by said leading and trailing folders, said front end tab folder holding the trailing tab in engagement with the front wall of the carton upon the progression of the tab to said folder, means applying glue to the undersurface of the forwardly extending end flaps of the carton, other means in advance of said glue applying means for folding the forwardly projecting end flap of a carton downward along the front wall thereof, and a spring biased pressure roller spaced in advance of said other means and exerting pressure on the downwardly folded front end flap and gluing said flap to the end tabs and front wall of the carton during travel of the carton thereby.

20. A carton folding and closing machine in accordance with claim 19 wherein a single motor is provided for driving the machine, wherein a transversely extending cam shaft is driven from said motor, wherein a drive is provided from said cam shaft to said flight conveyor and said endless chains supporting and driving said flight folders, wherein a drive is provided from said flight conveyor to said supply conveyor means and to said cam operating said pusher, and wherein two cams are mounted on said cam shaft, one cam rockably moving said rear end tab folder to fold the tabs inwardly along the front wall of the carton and the other cam exerting pressure on the top surface of the forwardly projecting tab of the carton lid and successively engaging the tab with said glue roller to effect the application of glue to the tab at spaced apart points therealong.

References Cited

UNITED STATES PATENTS

| | | | |
|---|---|---|---|
| 2,270,264 | 1/1942 | Carruth | 53—376 X |
| 2,993,319 | 7/1961 | Gaubert | 53—377 X |
| 3,045,408 | 7/1962 | Rasmusson | 53—376 |

FOREIGN PATENTS

| | | |
|---|---|---|
| 615,153 | 2/1961 | Canada. |

WILLIAM W. DYER, Jr., *Primary Examiner.*

JAMES M. MEISTER, *Examiner.*